(12) United States Patent
Hartwich et al.

(10) Patent No.: US 8,989,210 B2
(45) Date of Patent: Mar. 24, 2015

(54) METHOD AND BUS CONNECTION UNIT FOR UNAMBIGUOUSLY WAKING USERS OF A BUS SYSTEM

(75) Inventors: Florian Hartwich, Reutlingen (DE); Rasmus Rettig, Hamburg (DE)

(73) Assignee: Robert Bosch GmbH, Stuttgart (DE)

( * ) Notice: Subject to any disclaimer, the term of this patent is extended or adjusted under 35 U.S.C. 154(b) by 225 days.

(21) Appl. No.: 13/577,632

(22) PCT Filed: Feb. 8, 2011

(86) PCT No.: PCT/EP2011/051811
§ 371 (c)(1),
(2), (4) Date: Jan. 22, 2013

(87) PCT Pub. No.: WO2011/095637
PCT Pub. Date: Aug. 11, 2011

(65) Prior Publication Data
US 2013/0128899 A1 May 23, 2013

(30) Foreign Application Priority Data

Feb. 8, 2010 (DE) .......................... 10 2010 007 282
Feb. 7, 2011 (DE) .......................... 10 2011 003 726

(51) Int. Cl.
*H04L 12/43* (2006.01)
*H04L 12/40* (2006.01)

(52) U.S. Cl.
CPC . *H04L 12/40039* (2013.01); *H04L 2012/40215* (2013.01); *H04L 2012/40273* (2013.01)
USPC ......................................................... 370/458

(58) Field of Classification Search
CPC ....................................................... H04L 12/40
USPC .................................. 370/257, 421, 423, 437
See application file for complete search history.

(56) References Cited

U.S. PATENT DOCUMENTS

| | | | |
|---|---|---|---|
| 2004/0145500 A1 * | 7/2004 | Huebl | 340/994 |
| 2005/0025084 A1 * | 2/2005 | Heuts et al. | 370/315 |
| 2008/0276107 A1 * | 11/2008 | Bogavac | 713/323 |
| 2008/0300732 A1 * | 12/2008 | Luz et al. | 701/1 |
| 2009/0213915 A1 * | 8/2009 | Wagner | 375/220 |
| 2012/0210154 A1 * | 8/2012 | Hartwich | 713/323 |

FOREIGN PATENT DOCUMENTS

| | | |
|---|---|---|
| DE | 103 58 584 | 7/2004 |
| EP | 1 158 718 | 11/2001 |
| WO | 2006/003540 | 1/2006 |

* cited by examiner

*Primary Examiner* — Gary Mui
(74) *Attorney, Agent, or Firm* — Kenyon & Kenyon LLP (57) ABSTRACT

A method and a bus connection unit for selectively waking participants of a bus system in an idle state, the participants not in the idle state exchanging messages via the bus using a serial communication protocol, the messages characterized by a leading identifier, the participants not in the idle state deciding based on the identifier whether they receive the message, the messages being evaluated by the participants in the idle state in at least three phases, a number of signal properties, edges and/or edge changes being determined in a first phase, a sequence of time intervals between signal properties, edges and/or edge changes being determined in a second phase, a wake pattern being determined from the serial signal sequence of the message in a third phase, and participants in the idle state leaving the idle state as a function of the items of information determined during the three phases.

15 Claims, 10 Drawing Sheets

METHOD AND BUS CONNECTION UNIT FOR UNAMBIGUOUSLY WAKING USERS OF A BUS SYSTEM

FIELD OF THE INVENTION

The present invention relates to a method and bus connection unit for unambiguously waking users of a bus system.

BACKGROUND INFORMATION

CAN transceivers in current use as known from the existing art typically have two modes, an active mode for communication and a sleep mode, i.e. a power-saving idle state. The application program running on each CAN bus participant can set the desired operating mode, and the transceiver changes automatically from sleep mode to active mode as soon as it recognizes a dominant bit on the CAN bus. While the transceiver is in sleep mode, the rest of the CAN bus participant can be switched off and is then switched on again when the CAN transceiver changes to active mode. A selective putting to sleep and/or waking of individual transceivers and/or CAN bus participants via the CAN bus is not provided in currently existing art.

The necessity of minimizing the consumption of electrical energy in vehicles has given rise to the development goal of selectively switching off or putting to sleep individual CAN bus participants (i.e., as a rule control devices) and also selectively reawakening them. These control devices are not to wake up every time they recognize a dominant bit on the CAN bus, but rather only when they recognize a specific message or a specific signal sequence on the CAN bus.

Patent document DE 103 58 584 A1 discusses a two-stage method for decoding a wake identifier in the data field of a CAN message by counting edges in the message until the data field is reached, with subsequent decoding through pattern recognition. In this way, the CAN transceiver can be operated in four modes. In addition to the modes described above, there is an additional savings mode and an intermediate mode. From the sleep mode, the transceiver changes automatically to savings mode as soon as it recognizes a dominant bit on the CAN bus. In the savings mode, it acquires a signal property and changes to the intermediate mode when it recognizes, within a specified time span, a number of signal properties, e.g. edges. From the intermediate mode it changes to the active mode only as soon as it recognizes a particular pattern in the 8-byte-long data field of the CAN message, which it decodes according to a specific method for this purpose. The wake pattern is configured for each CAN transceiver. If the transceiver does not recognize the wake pattern in the message, it goes back into savings mode. In intermediate mode, the power consumption is only slightly higher than in savings mode; the rest of the CAN node can remain switched off.

In this way, CAN networks are possible having so-called partial network operation, in which individual nodes remain in the power-saving savings mode and are monitored, while the other nodes communicate via the CAN bus. The individual nodes can be selectively reawakened from savings mode by an individual CAN message, the wake message. This is called selective wakeup. A plurality of wake messages can also be configured for one node.

Patent document WO2006/003540 A1 discusses another method for recognizing wake signals in which the duration of successive dominant and recessive phases is compared, and from this in each case the information '1,' '0,' or 'invalid' is recognized. Here the continuous bitstream on the bus is read without taking into account the message format.

SUMMARY OF THE INVENTION

A further demand made on partial network operation, in addition to the named possibility for selective addressing of individual participants, is the one-to-oneness of the wake messages for selective wakeup. Normal bus communication between other active bus participants, using in principle arbitrary messages, must not in any case result in undesired awakening. The above-described methods do not address this requirement. In both cases, in addition to a defined and desired message, further messages can be constructed that could also result in waking.

The method described here is intended to ensure that a participant is awakened exclusively by the (one or more) waking message defined individually for that participant. This method guarantees the one-to-one assignment of messages to participants. The method is described in relation to the example of a CAN network, but also functions usefully, in addition to the CAN protocol, with all network protocols having structured messages and a limited maximum message length.

The method is advantageously carried out in a bus connection unit that has arrangements suitable for carrying out the method. The arrangements can for example include components by which signal properties such as edges are recognized and counted. In addition, for the carrying out of the method for example arrangements are to be provided by which time distances between the occurrence of particular signal properties, for example between edges, can be determined and stored, for example counters in connection with a suitable clock pulse generator and register or memory cells. Also advantageous are arrangements for determining the current bus level at particular times. Suitable arrangements for carrying out these tasks are understood from the related art, and can be combined together with suitable voltage regulators for the individual components and arrangements to form a device with which the method according to the present invention can be carried out.

The method according to the present invention is based on the two-stage method of DE 103 58 584 A1, which is hereby incorporated into the present patent specification by reference.

A property of the method described there is that for the acquisition of the signal property in savings mode no clock signal of a precise oscillator is required, as is required for example for the bit-by-bit evaluation of a CAN message. In the presented example, edge changes are merely counted. However, cases are conceivable in which, after counting the required number of edges, when there is an accidentally matching message the subsequent evaluation of the coded information in intermediate mode could falsely yield a positive result.

Advantageously, therefore, the method is supplemented to form a method having at least three stages. For the example chosen in DE 103 58 584 A1 of a CAN network, in addition to the coding of a wake message in an 8-byte-long data field of the wake message, the arbitration field is also coded in a particular manner, for example being limited to particular values that are advantageous for the method. Advantageously, the arbitration field and the subsequent control field having the data length code are divided into two parts that are differently evaluated in two successive phases in the context of the evaluation carried out by participants in savings mode. In the third phase (intermediate mode), the wake pattern is then decoded from the data field. As a function of the information communicated in the three phases, the respective idle state (sleep, savings, or intermediate mode) is either departed from or not.

In the first phase (phase 1: initialization), signal properties, in particular edge changes, are counted. No oscillator is required for the time measurement. Advantageously, the waking process is continued or not as a function of the comparison of the counted signal properties with a specified or specifiable number of signal properties.

In the subsequent, second phase (phase 2: synchronization pattern detection), time intervals between edge changes, and/or the ratio thereof, are measured. For this, an oscillator is required that however can be relatively imprecise, because for example it is merely checked whether the times measured one after the other stand in a defined ratio to one another. That is, the sequence of the edge changes must yield a specified pattern (synchronization pattern). Advantageously, the waking process is continued or not as a function of the comparison of the measured sequence of time intervals and/or the ratio thereof with a specified or specifiable sequence.

The synchronization pattern is advantageously selected such that the sequence of time intervals corresponding to the synchronization pattern within a message that conforms to the communication protocol can be represented such that at least two time intervals, or the ratio of two of the time intervals, are specified by the protocol. In this way, in a message that conforms to the protocol, due to boundary conditions that specify the protocol being used an accidentally positive result is reliably prevented during evaluation of the coded information in intermediate mode.

In an advantageous realization in a CAN network, the synchronization pattern includes the reserved bits before the beginning of the data length code. A message deviating from the provided wake message (e.g. having a missing edge in the identifier) causes a shift in the position of the reserved bits within the bits evaluated in phase 2, and thus to a deviant sequence of the time intervals of the edge changes, and thus to rejection of the message with regard to the wake function.

For the depicted example in a CAN network, the synchronization pattern is advantageously selected such that, within a data framework that conforms to protocol, it can occur accidentally at the earliest with a shift of 20 bits relative to the intended position. According to the exemplary embodiments and/or exemplary methods of the present invention, through suitable choice of the number of signal properties that are to be counted and of the following synchronization pattern, it is ensured that when there is a faulty, or accidental, running through of these two phases the remaining message length is no longer sufficient to accommodate the coded individual wake pattern.

In particular, for this purpose it is advantageous to specify the number of signal properties to be determined in the first phase as the maximum possible number relative to the communication protocol, and/or to specify the sequence of time intervals to be determined in the second phase as the sequence of shortest possible time intervals relative to the communication protocol.

The second phase is followed by the third phase (phase 3: wake pattern detection). Advantageously, in the depicted example of a CAN network the beginning of the data field is marked by the synchronization pattern. The third phase, i.e. the wake pattern detection, then takes place as an evaluation of the data field, which can take place using the method from DE 103 58 584 A1. However, a method modified in relation thereto may also advantageously be used, which is described in an exemplary embodiment of this patent specification and which has a higher degree of security with regard to errored waking.

According to the exemplary embodiments and/or exemplary methods of the present invention, for the determination of the sequence of logical information that is to be determined in the third phase, for each item of logical information a plurality of bits of a message are evaluated, a further time interval being determined between signal properties and/or edges and/or edge changes, and subsequently the signal level of the bus is sampled at a first sample time and at a second sample time, the first and/or second sample time being a function of the determined further time interval, and the item of logical information being derived as a function of the result of the at least two samplings.

It is particularly advantageous if at the first and/or second sample time a multiple sampling is carried out, the time interval or intervals between the times of the multiple sampling being smaller than the time interval between the first and the second sampling time.

In a particular realization, in order to determine each individual item of logical information in the sequence of items of logical information, in each case eight bits of the message are evaluated. In a specific embodiment, the time interval between the first and the second sampling time, and/or the time interval between the last signal property and/or edge and/or edge change used to determine the further time interval and the first sampling time, correspond approximately to the determined further time interval.

In the following, the exemplary embodiments and/or exemplary methods of the present invention are explained in more detail on the basis of the drawings.

BRIEF DESCRIPTION OF THE DRAWINGS

FIG. 3.1 shows the division of the messages into regions that are evaluated in the individual phases of the method.

FIG. 3.2 shows an example of a wake message and the evaluation thereof in the first and second phase of the method.

FIG. 4.1 describes various examples of message identifiers that are suitable for the initialization in phase 1 and for the synchronization in phase 2.

FIG. 5.1 shows how the synchronization pattern according to the present invention ensures that the decoding of the wake pattern from the data field in phase 3 is begun at the correct time.

FIGS. 5.2 and 5.3 show in exemplary fashion that after accidental recognition of a synchronization pattern in the data field, the remaining bits of the message no longer leave sufficient space for a wake pattern.

FIGS. 6.1 and 6.2 describe an exemplary embodiment for the decoding of the wake pattern in phase 3.

DETAILED DESCRIPTION

In the following, exemplary embodiments are described of the method and device according to the present invention. These concrete examples are used to explain the embodiment, but do not limit the scope of the basic idea of the invention.

Figure 1:
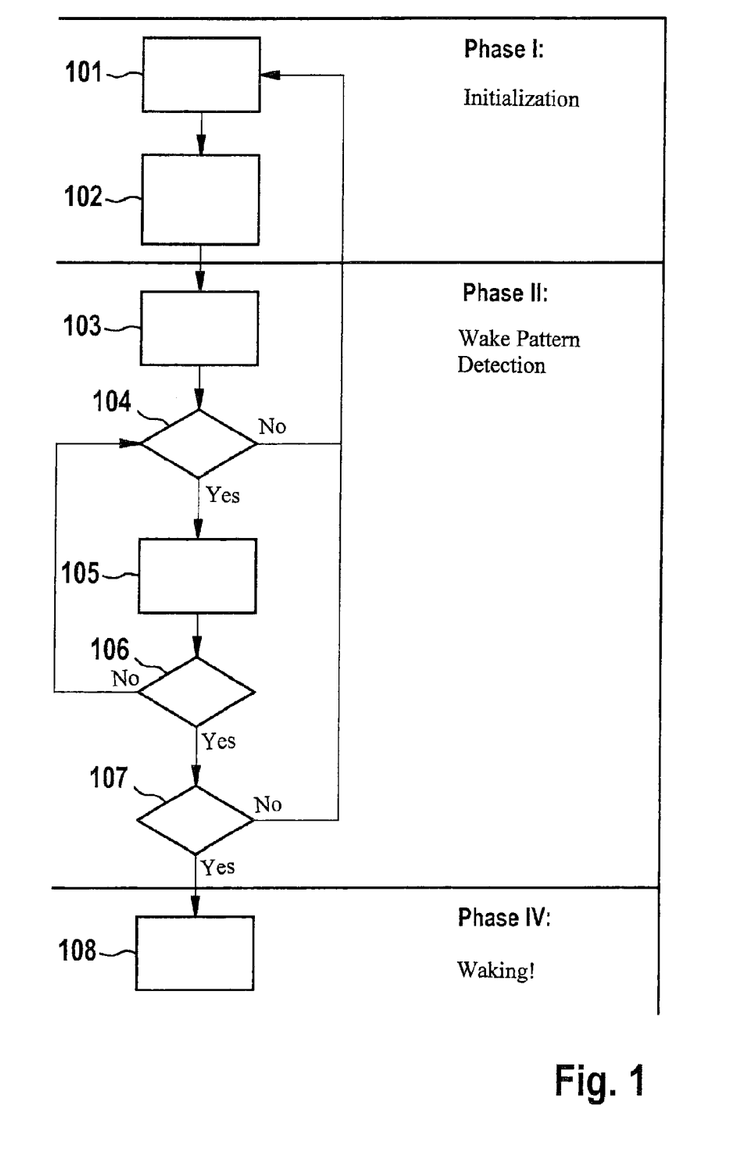
FIG. 1 shows the sequence of the method according to the existing art.

FIG. 1 shows the sequence of the method known from the existing art. A first phase is used for initialization. Next, in block 101 the beginning of a message is recognized at an edge that falls from recessive to dominant. Subsequently, in block 102, falling edges are counted until a number of, for example, eight is reached. In the second phase, the detection of the wake pattern takes place. Here, for example a total of eight bits are read out from the data field of the message, according to the described method. In a first step 103 the first eight bits of the data field are analyzed. In a second step 104 each bit is checked for validity. When validity has been determined, the decoded value of the bit is stored in step 105; otherwise the wake method is terminated. If eight valid bits are decoded, which is checked in step 106, then in step 107 the decoded pattern is compared to a stored wake pattern. If agreement is present then in step 108 the wake process is introduced.

Figure 2:
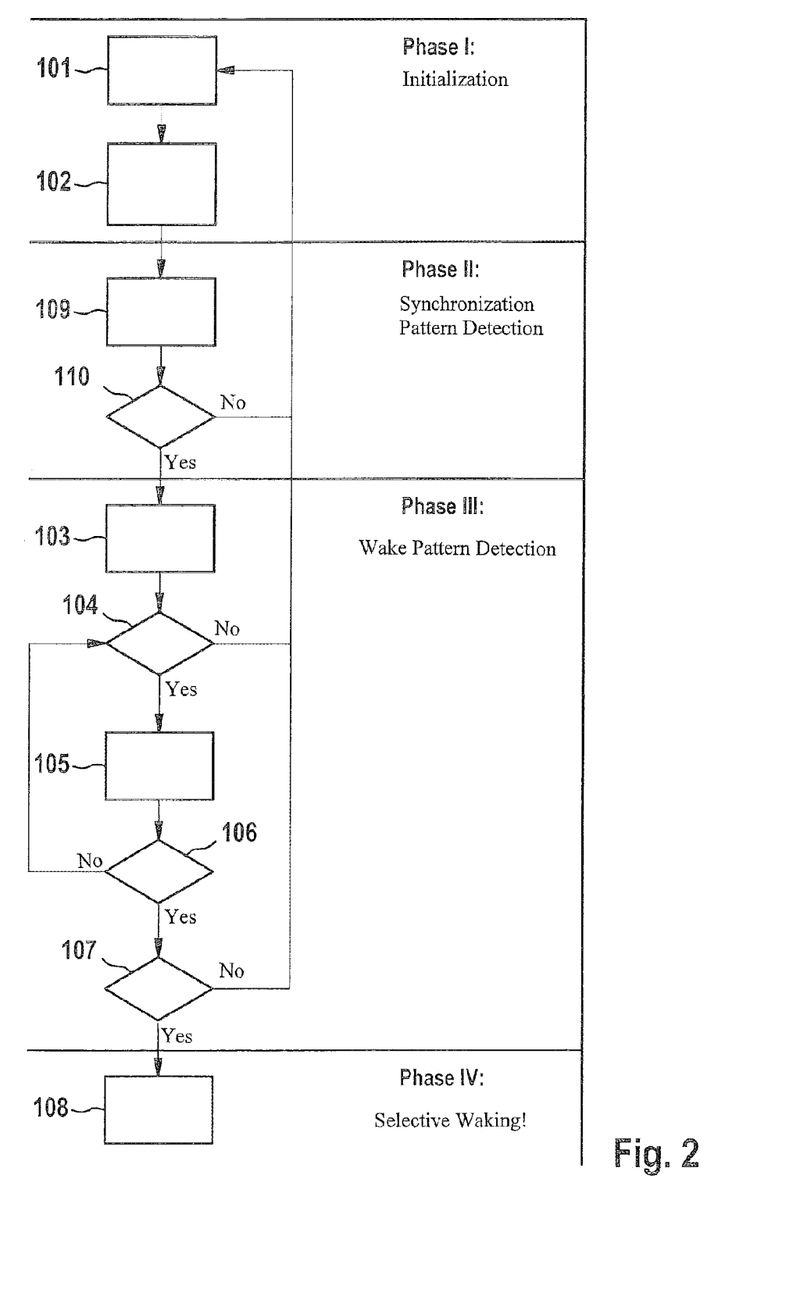
FIG. 2 shows the sequence of the method according to the present invention.

In contrast to this, FIG. 2 shows the expanded method according to the present invention. The first phase of the method, with steps 101 and 102, corresponds to the procedure from the existing art that was explained in FIG. 1. After for example eight falling edges have been counted, then in the method according to the present invention a second phase begins that can be divided into two steps. First, in a step symbolized by block 109, the content of the message is compared to a specified synchronization pattern. For this purpose, according to the present invention, as is explained in more detail in connection with FIG. 3.2, a sequence of time intervals (T1, T2, . . . ) between signal properties and/or edges and/or edge changes is determined. In block 110 this is compared to a specified pattern, or to a specified or specifiable sequence of time intervals or a specified or specifiable sequence of ratios of time intervals. If the specified synchronization pattern is recognized, then the third phase begins, with steps 103 through 107, in which the detection of the wake pattern takes place. The detection of the wake pattern again takes place through the decoding of individual bits from the data field; here the method used can correspond to that used in the named existing art, or may also be modified. An example of a modified method is presented in connection with FIGS. 6.1 and 6.2. In step 108 the wake process is introduced as a function of the result of the decoding.

Figure 31:
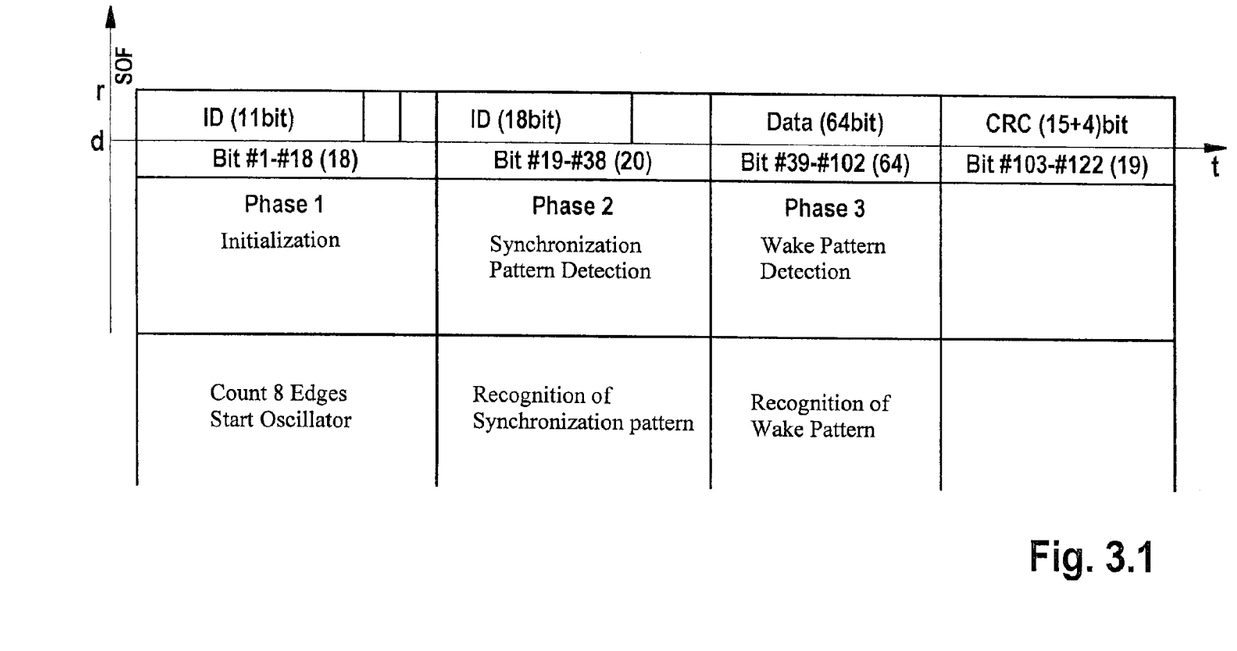

FIG. 3.1 shows an example of how a CAN message can be evaluated phase-by-phase in the method according to the present invention. After the "start of frame" bit SOF, in this example the first 18 bits are evaluated by counting the number N of falling edges from recessive to dominant bus level. At the same time, in this phase the oscillator is started that is required for later phases and that can stabilize during phase 1. In the exemplary embodiment presented here, the following 20 bits are used to carry out the second phase of the method, in which the occurrence of a specified or specifiable synchronization pattern in the message is evaluated. There follow a further 64 bits, corresponding to the data field of the CAN message, which in the depicted exemplary embodiment can be used to recognize the wake pattern in the third phase. The remaining bits of the CAN message, i.e. CRC and Acknowledge, are not specifically used for the wake method according to the present invention. They follow the rules specified by the protocol, so that the wake messages for other, already-active bus participants can be regarded as messages according to protocol, and faulty messages are not released.

Figure 32:
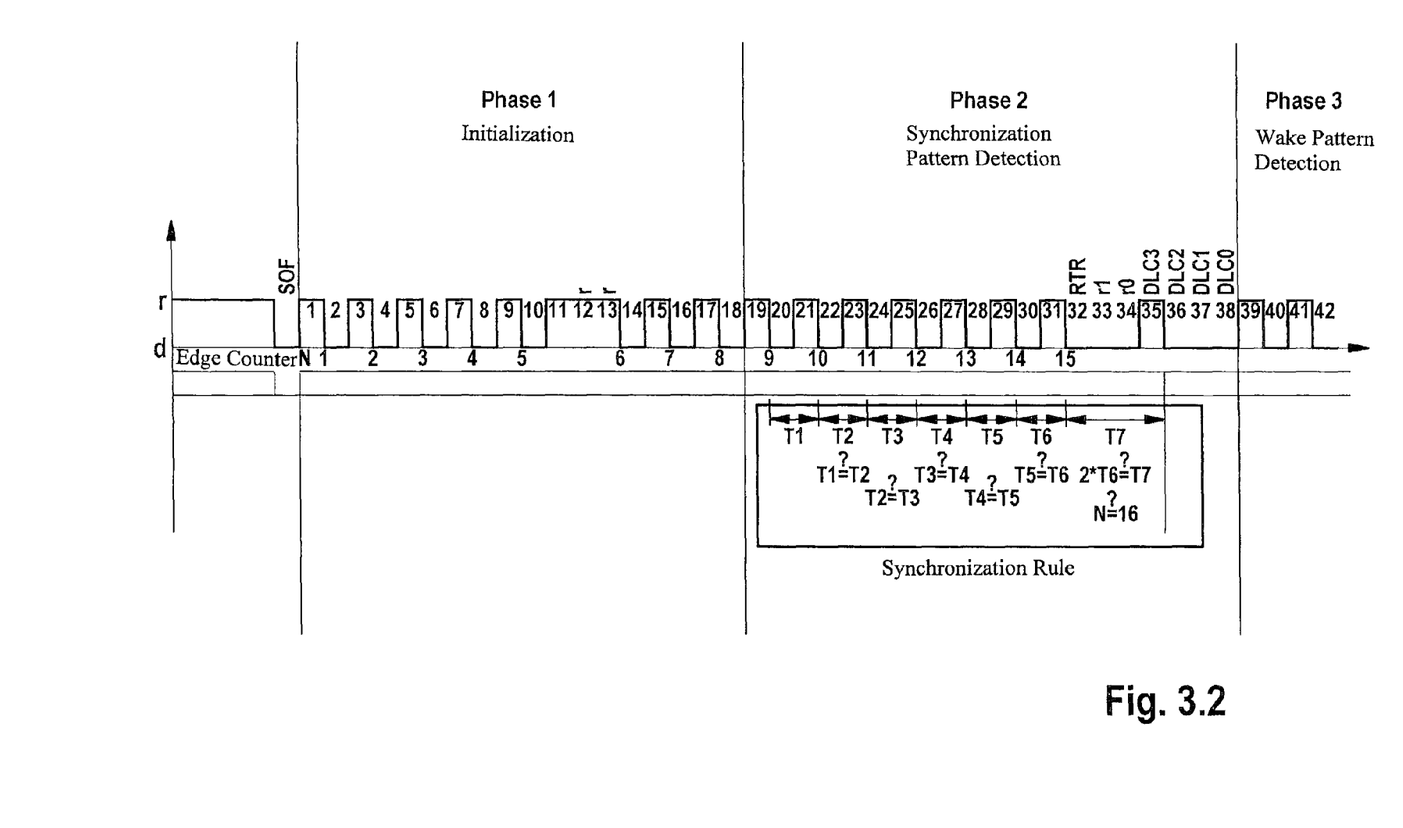

FIG. 3.2 shows an exemplary embodiment of the leading segment of a wake message according to the present invention. After the leading bit SOF, which signals the beginning of the message, there follow 18 bits that are evaluated in the first phase (initialization). The values of these 18 bits are here selected such that eight falling edges occur. Bits no. 12 and 13 are defined by the CAN protocol, and the values of the other bits are selected such that a maximum number of edges occurs. A different choice of values is possible, as is explained in more detail in connection with FIG. 3.3.

In wake message 20 shown in FIG. 3.2, there follow further bits that are used according to the present invention for the recognition of a synchronization pattern. In the depicted example, the synchronization pattern is selected such that at first seven falling edges follow one another with the same time interval, and subsequently an eighth falling edge occurs after twice the time interval has elapsed. In the method according to the present invention, in the depicted example time intervals T1, T2, T3, T4, T5, T6, T7 between the falling edges are measured and compared to one another.

In the depicted example, there occur six equal time intervals (T1, T2, T3, T4, T5, T6), followed by a seventh time interval having twice the value: T7=2×T6. According to the present invention, the fact is exploited that the values of bits no. 32 through no. 34 are defined by the CAN protocol. Due to this, and due to the boundary conditions that are valid for the data length code, an identical synchronization pattern within a CAN message cannot reoccur until the data field, which begins with bit no. 39. Other values could also be selected for preceding bits no. 19 through no. 31, as long as it is ensured that the resulting pattern cannot occur with a shift of less than 20 bits in a CAN message conforming to protocol.

In addition, as shown in FIG. 3.2, in the context of the wake method the total number N of falling edges in the CAN message registered since the start-of-frame bit can also be checked. The edge counter used in the first phase of the method then simply continues to run, as shown in the Figures. As an additional condition for the waking, it is required that in the second phase the counter must reach at least one particular specified or specifiable value. (For the sake of simplicity, in the Figures not all edges that are to be counted are labeled; rather, the labeling ends at 14 or 15 edges.) In the exemplary embodiment shown in FIG. 3.2, after bit 35 a total of 16 falling edges would have occurred. Thus, the detection of a number N=16 of edges could be required as an additional wake condition.

Figure 41:
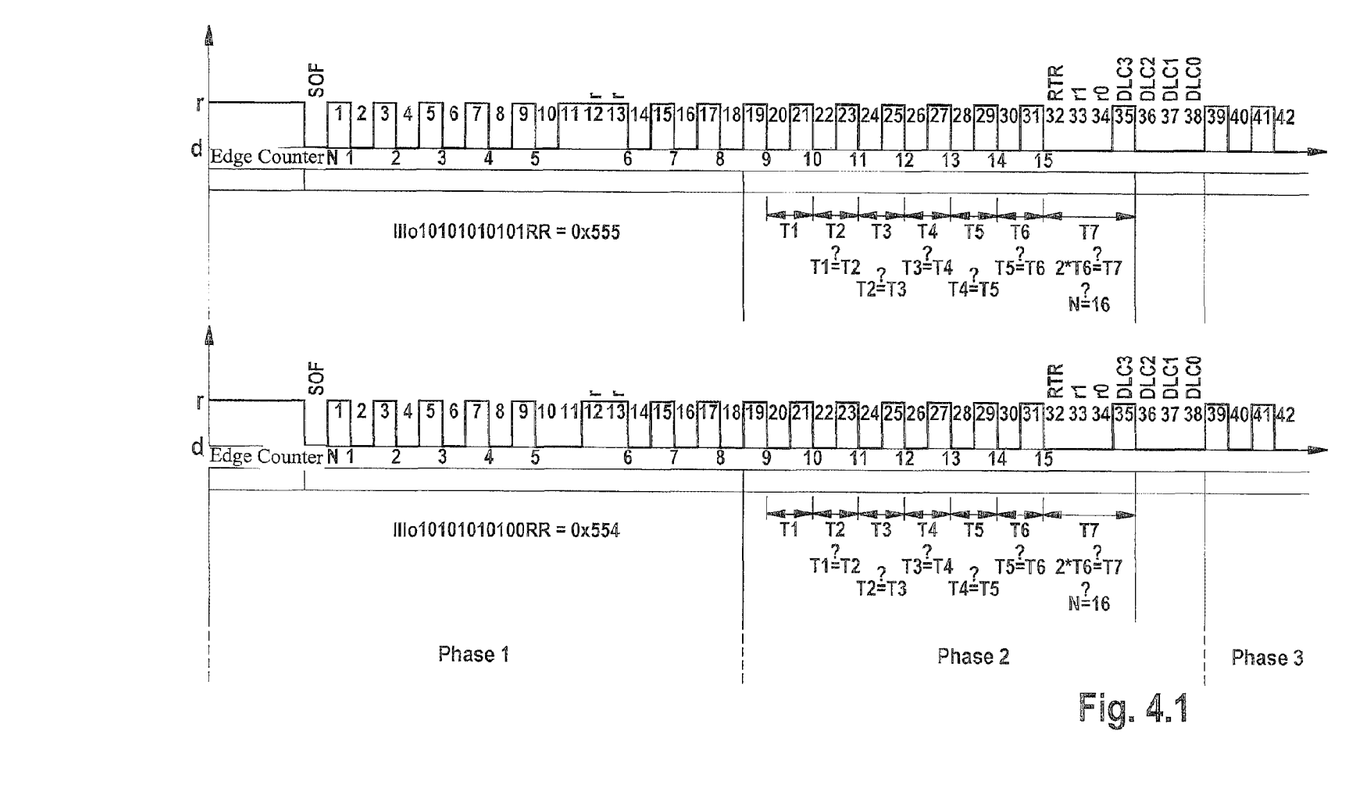

FIG. 4.1 shows various exemplary embodiments of identifiers of CAN messages according to the present invention. As is shown, the identifiers can differ in the region that is evaluated in the first phase, in such a way that the number of falling edges remains equal. For example, in contrast to the example shown in FIG. 3.2, the change from dominant to recessive can take place only after bit no. 11. Equally, the change from recessive to dominant could be shifted relative to the latter example, so that it takes place only after bit no. 10, and so on. The following is presented in order to explain the identifiers that can be represented in this way:

| Binary<br>Bit nos. 1-11 | Hexadecimal<br>Bit nos. 1-11 & 14-31 | Hexadecimal<br>Identifier |
|---|---|---|
| 10101010101 | 0x555h & 0x15555h | 0x15555555h |
| 10101010100 | 0x554h & 0x15555h | 0x15515555h |
| 10101010110 | 0x556h & 0x15555h | 0x15595555h |
| 10101010010 | 0x552h & 0x15555h | 0x15495555h |
| 10101011010 | 0x55Ah & 0x15555h | 0x15695555h |
| 10101001010 | 0x54Ah & 0x15555h | 0x15295555h |
| 10101101010 | 0x56Ah & 0x15555h | 0x15A95555h |
| 10100101010 | 0x52Ah & 0x15555h | 0x14A95555h |
| 10110101010 | 0x5AAh & 0x15555h | 0x16A95555h |
| 10010101010 | 0x4AAh & 0x15555h | 0x12A95555h |
| 11010101010 | 0x6AAh & 0x15555h | 0x1AA95555h |
| 01010101010 | 0x2AAh & 0x15555h | 0x0AA95555h |

In this variation, the values of bits no. 14 through no. 38 remain unmodified. A property that is shared by all identifiers according to the present invention is that within the bits evaluated in the first phase (thus, in the depicted example, within bits no. 1 through no. 18) the number of falling edges shown is the maximum possible number in the context of the protocol specifications.

The effect of the selection of identifiers made according to the present invention on security with regard to faulty waking is that no CAN message can occur in which the specified number of falling edges is reached earlier than in the wake message. Correspondingly, the second phase of the wake method, and the accidental recognition of the specified synchronization pattern in a CAN message, which could result in faulty wake processes, also cannot begin earlier than with bit no. 19.

Figure 51:
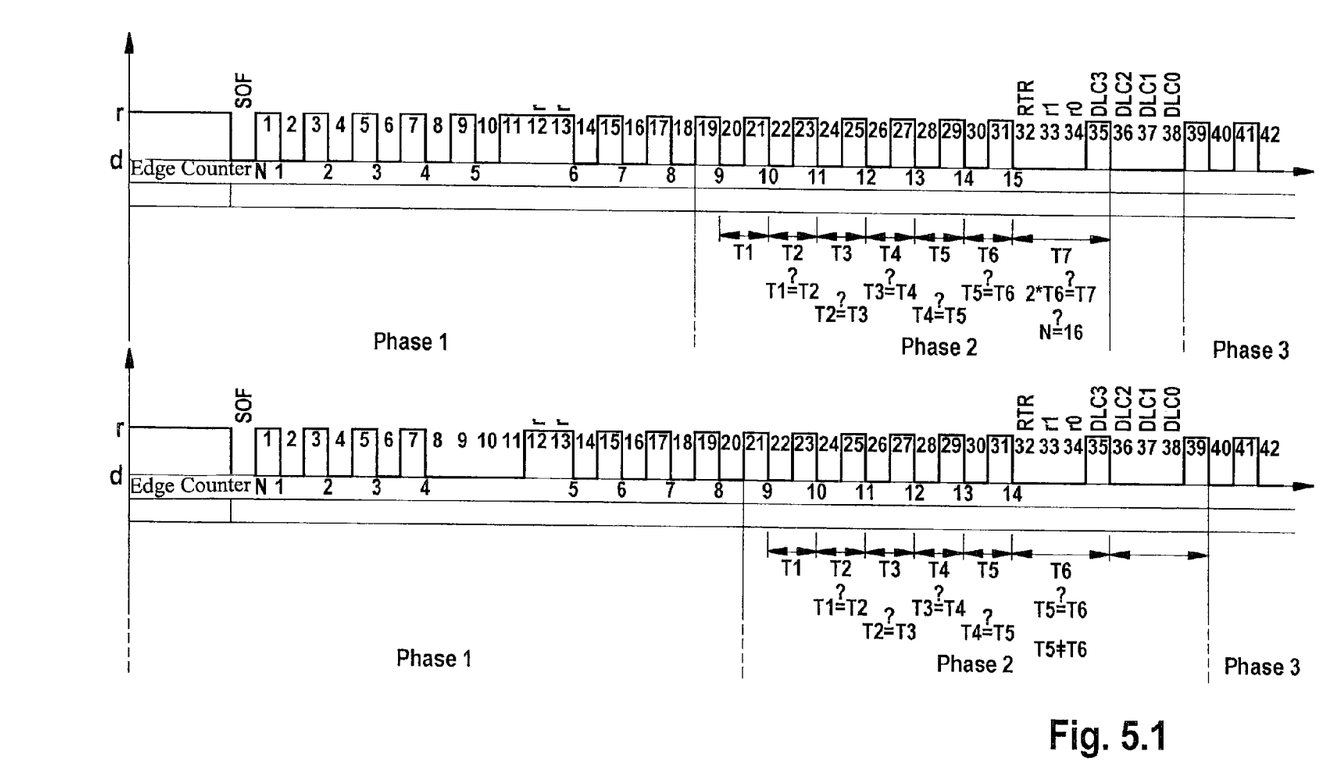

FIG. 5.1 shows a further effect of the selection of identifiers made according to the present invention on security against faulty waking. Each message that differs relative to this selection, having a smaller number of falling edges within the first 18 bits, results in a correspondingly later beginning of the second phase. Due to the determined values of bits no. 32 through no. 34 and the data length code in bits no. 35 through no. 38, the observed time interval T6 is not equal to the previously observed time interval T5: T6 T5. Measured time interval T7 also does not follow the specification; rather, T7≠2×T6. Thus, a matching synchronization pattern does not occur, and no waking process takes place. Thus, in the depicted example, in principle no matching synchronization pattern can occur in the CAN message that begins earlier than with bit no. 39.

A further possible variation is the inversion of all values of bits no. 14 through no. 30, which would entail a matching of the falling edges N to be counted and the expected time intervals T1, T2, . . . in the synchronization pattern. In addition, in this example, in a message that conforms to protocol the synchronization pattern could occur at the earliest with a shift of 20 bits.

Figure 52:
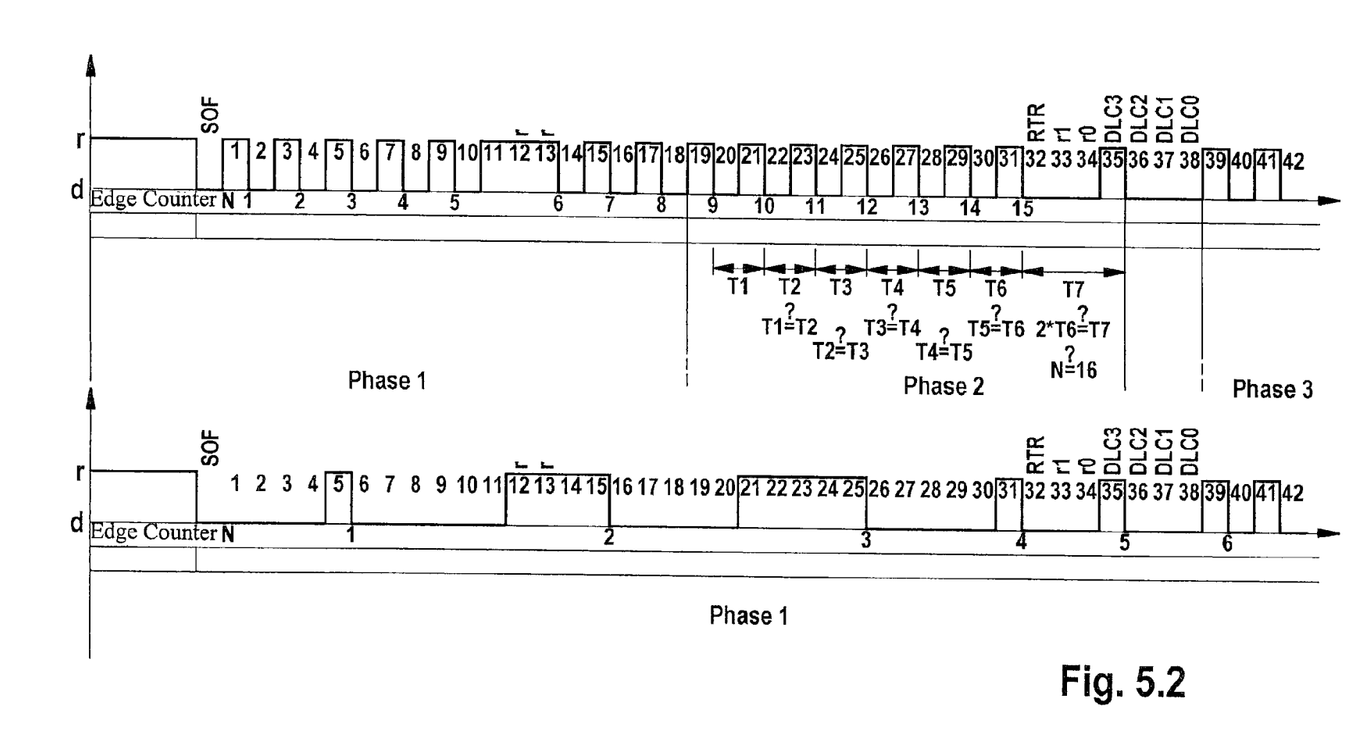
Figure 53:
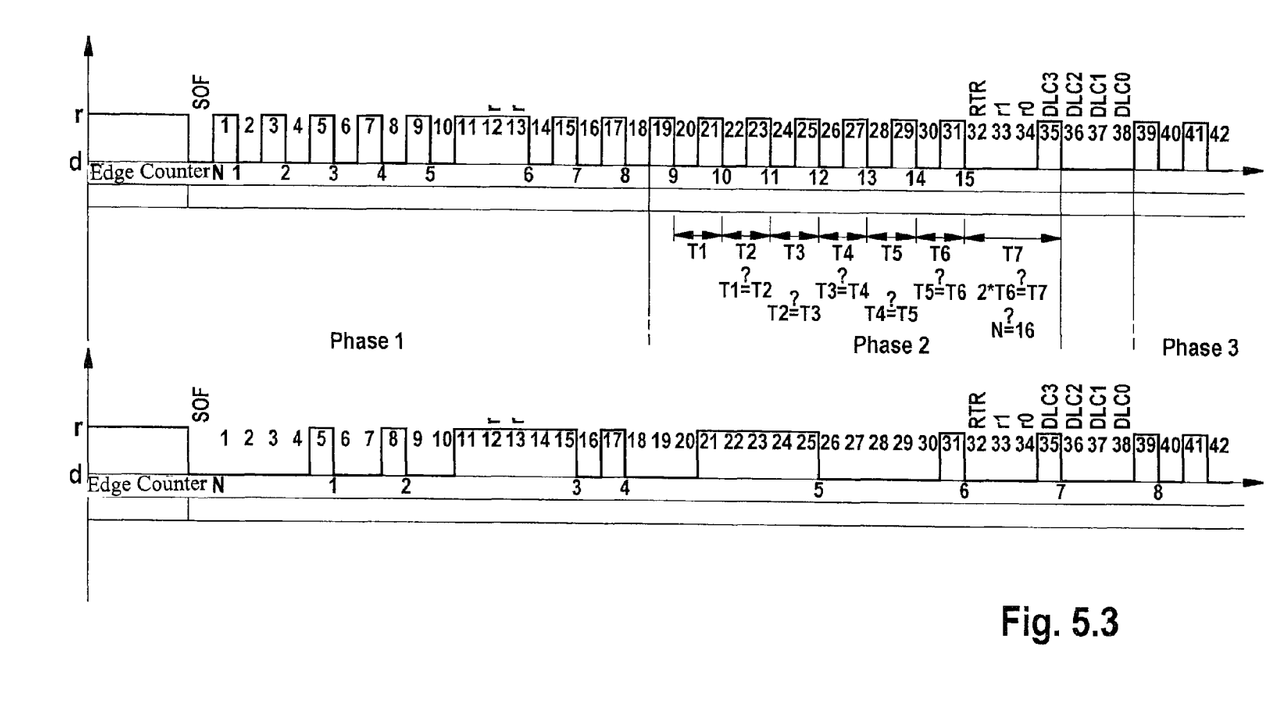

FIGS. 5.2 and 5.3 show two examples of a CAN message in which the number of falling edges specified in the first phase is not reached until bit 39 or later has passed. In this case, because the bits of the data field are not subject to any limitation by the CAN protocol, it would be possible in principle for a correct synchronization pattern to occur in the further course of the CAN message. However, due to the limited length of the CAN messages, in this case there would no longer be sufficient space in the CAN message after the synchronization pattern to also accommodate the wake pattern evaluated in the third phase, because the synchronization pattern (20 bits) and the wake pattern (64 bits) comprise 84 bits, but beginning from bit no. 39, only the data field, made up of 64 bits in this case, and the CRC field, which is a maximum of 19 bits including possible stuff bits, are still available in the CAN message. Thus, the CAN message shown here also would not result in the carrying out of a wake process.

Overall, therefore, it has been shown that through the selection according to the present invention of the identifiers, or of the number of falling edges in phase 1, namely as the maximum possible number of edges, it is ensured that only the message provided for the wake task having the corresponding identifier at the correct time, namely in the presented case with the passage of bit no. 18, has the specified number of falling edges. Through the selection of the synchronization pattern, in particular through the building in of message segments that are specified by the protocol, it is ensured that an accidentally matching synchronization pattern can occur in a CAN message at the earliest only with a shift of 20 bits. Finally, the maximum possible message length (taking into account stuff bits) ensures that a CAN message having an accidentally matching synchronization pattern shifted by at least 20 bits also cannot trigger a successful wake process.

Figure 61:
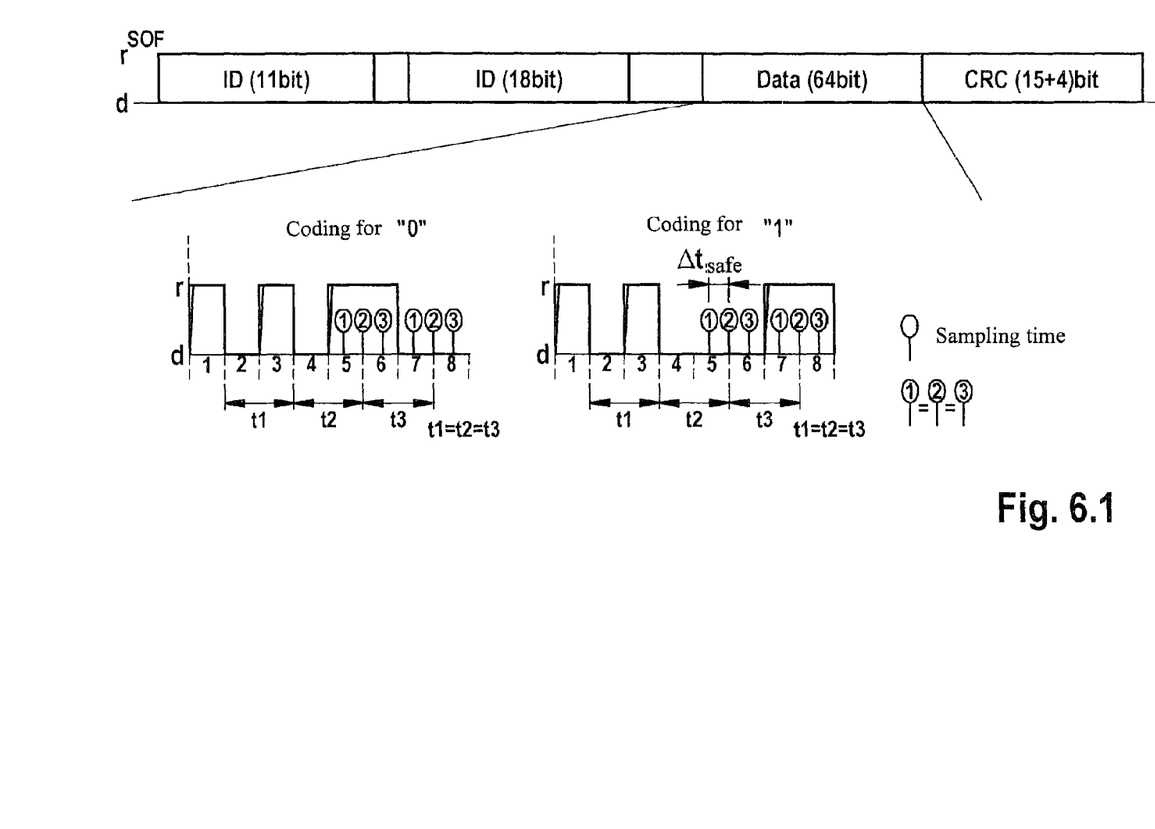

FIG. 6.1 shows an example for the decoding of the wake pattern from the 64 bits of the data field. The method is related to the method indicated in DE 103 58 584 A1, whose disclosure is hereby incorporated into the present description by reference. Mixed forms between the method described there and that named as an example herein are also conceivable for the decoding of the wake pattern. In the presented example, in a CAN message, for the recognition of the wake pattern an item of logical information is determined from each eight bits of the data field. The eight items of logical information from the data field, which comprises eight bytes, then yield a determined pattern that is compared to the specified or specifiable wake pattern. A decision regarding the continuation of the wake process is made as a function of the comparison.

In the exemplary embodiment shown here, for the determination of the item of logical information, in a first step two falling edges are used to measure a time span t1 that is used for the further evaluation. For this purpose, the first four bits of each byte within the data field should have the values "r d r d," where "r" stands for recesses and "d" stands for dominant. Equally, however, the measurement of time span t1 could also be based on the rising edges. Instead of the bit sequence "r d r d," the bit sequence "d r d r" could also be used. Alternatively, it would be possible, as in the existing art, to use one rising and one falling edge for the time measurement, in which case the bit sequence would for example run "d r r d."

In the depicted example, the determination of the item of logical information further takes place in that, in a second step, after the elapsing of a time span t2, which corresponds approximately to t1, and after the further elapsing of a time span t3 corresponding approximately to t1, the bus level is determined in each case. If the bus level determined after time span t2 is recessive and the bus level determined after t3 is dominant, the byte is recognized as a logical "0." If after t2 a dominant bus level is present and after t3 a recessive bus level is present, a logical "1" is recognized. For the case in which the same bus level is measured after the elapsing of time spans t2 and t3, the byte is rejected and the decoding is terminated. Waking does not take place. Of course, a reversed or differing interpretation of the read-out bytes as binary data is also possible; there must merely be an unambiguous assignment of the four possible combinations of the levels read out after t2 and t3 to the values "0," "1," and "invalid."

FIG. 6.1 further shows how the method can be made more robust against faulty waking by sampling the bus level multiple times after each of the two time spans. In the Figure, as an example a threefold sampling is provided. However, sampling can also take place twice, four times, etc. The interval Δt_safe between the samplings can be realized either as a percentual value of the determined first time span t1 or as a fixedly specified or specifiable value. If during the multiple sampling after the elapsing of time span t2 or after the elapsing of time span t3 bus levels are determined that are not identical, according to the present invention a decision of "invalid" is likewise made, and the decoding is terminated. Alternatively, a majority selection could also be made, i.e. for example a "two out of three" decision could be made for the determination of the bus level.

Figure 62:
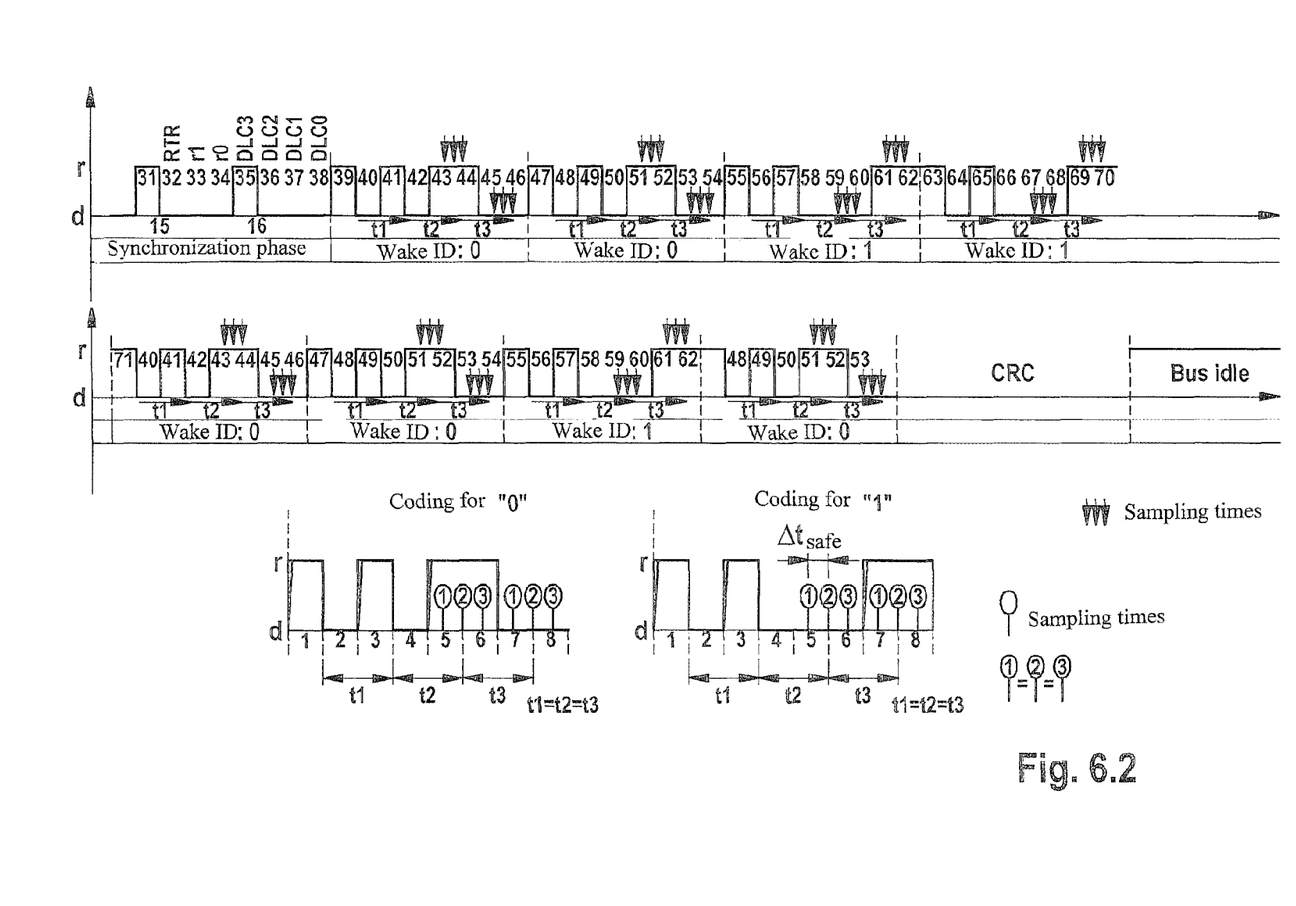

FIG. 6.2 shows the complete data field of a wake message according to the present invention, beginning with bits number 39. Shown are eight bytes that can be evaluated using the method according to the present invention, and which in the depicted case result in a wake pattern "0 0 1 1 0 0 1 0."

A bus connection unit that executes the method according to the present invention has arrangements that are suitable for carrying out the individual steps of the method. Thus, a bus connection unit for the base bus system from the related art is to be supplemented by corresponding arrangements if these are not already present. These include arrangements by which signal properties such as edges are recognized and counted in the idle state. In addition, for the execution of the method arrangements are for example to be provided by which time intervals between the occurrence of particular signal properties, such as between edges, can be determined and stored, such as for example counters in connection with a suitable pulse generator and registers or memory cells. Also advantageous is an arrangement for determining the current bus level at particular times. Suitable arrangements for carrying out these tasks should be understood and can be combined with voltage regulators, which provide the individual arrangements and components with a supply voltage as a function of output signals of other arrangements and components, to form a device with which the method according to the present invention can be carried out. If suitable arrangements are already present in a bus connection unit understood from the related art, then of course it is sufficient merely to correspondingly modify the voltage supply thereto so that they can be selectively supplied with voltage in the context of the wake method.

What is claimed is:

1. A method for selectively waking participants of a bus system that are in an idle state, the participants not in the idle state exchanging messages via the bus using a serial communication protocol, the messages being characterized by a leading identifier, the participants not in the idle state deciding based on the identifier whether they receive the message, the method comprising:
    evaluating the messages by the participants in the idle state in at least three phases, by performing the following:
        determining in a first phase at least one of a number of signal properties, edges, and edge changes;
        determining in a second phase that a sequence of time intervals between at least one of signal properties, edges, and edge changes correspond to a synchronization pattern by which the message is identified as conforming to the communication protocol; and
        responsive to the identification, in the second phase and based on the sequence, that the message conforms to the communication protocol, determining in a third phase a sequence of items of logical information from the serial signal sequence of the message;
    wherein participants in the idle state leave the idle state as a function of the items of information determined during the at least three phases.

2. The method of claim 1, wherein the number of signal properties to be determined in the first phase is compared to a specified or specifiable number of signal properties, and the wake process is continued or not as a function of the result of the comparison.

3. The method of claim 1, wherein at least one of the sequence of time intervals determined in the second phase and their ratio is compared to at least one of a sequence of time intervals and ratios specified or specifiable as the synchronization pattern.

4. The method of claim 1, wherein the number of signal properties to be determined in the first phase is specified as the maximum possible number relative to the communication protocol.

5. The method of claim 1, wherein the sequence of time intervals to be determined in the second phase is specified as the sequence of the shortest possible time intervals relative to the communication protocol.

6. A method for selectively waking participants of a bus system that are in an idle state, the participants not in the idle state exchanging messages via the bus using a serial communication protocol, the messages being characterized by a leading identifier, the participants not in the idle state deciding based on the identifier whether they receive the message, the method comprising:
    evaluating the messages by the participants in the idle state in at least three phases, by performing the following:
        determining in a first phase at least one of a number of signal properties, edges, and edge changes;
        determining in a second phase a sequence of time intervals between at least one of signal properties, edges, and edge changes; and
        determining in a third phase a sequence of items of logical information from the serial signal sequence of the message;
    wherein:
        participants in the idle state leave the idle state as a function of the items of information determined during the at least three phases;
        at least one of the sequence of time intervals determined in the second phase and their ratio is compared to at least one of a sequence of time intervals and ratios specified or specifiable as a synchronization pattern; and
        the wake process is continued or not as a function of the result of the comparison; and
        the synchronization pattern is selected such that the sequence, corresponding to the synchronization pattern and determined in the second phase, of time intervals within a message conforming to the communication protocol is representable so that at least two time intervals or the ratio of two of the time intervals are specified by the protocol.

7. A method for selectively waking participants of a bus system that are in an idle state, the participants not in the idle state exchanging messages via the bus using a serial communication protocol, the messages being characterized by a leading identifier, the participants not in the idle state deciding based on the identifier whether they receive the message, the method comprising:
    evaluating the messages by the participants in the idle state in at least three phases, by performing the following:
        determining in a first phase at least one of a number of signal properties, edges, and edge changes;
        determining in a second phase a sequence of time intervals between at least one of signal properties, edges, and edge changes; and
        responsive to the identification in the second phase that, based on the sequence, the message conforms to the communication protocol, determining in a third phase a sequence of items of logical information from the serial signal sequence of the message;
    wherein:
        participants in the idle state leave the idle state as a function of the items of information determined during the at least three phases; and
        the number of signal properties to be determined in the first phase and the sequence of time intervals to be determined in the second phase within a message suitable for waking are specified so that an occurrence of the number and the sequence of time intervals at a position other than that provided within a message conforming to the communication protocol is possible only if from this message no complete sequence of items of logical information can be determined for the third phase.

8. A The method for selectively waking participants of a bus system that are in an idle state, the participants not in the idle state exchanging messages via the bus using a serial communication protocol, the messages being characterized by a leading identifier, the participants not in the idle state deciding based on the identifier whether they receive the message, the method comprising:
  evaluating the messages by the participants in the idle state in at least three phases, by performing the following:
    determining in a first phase at least one of a number of signal properties, edges, and edge changes,
    determining in a second phase a sequence of time intervals between at least one of signal properties, edges, and edge changes, and
    determining in a third phase a sequence of items of logical information from the serial signal sequence of the message;
  wherein:
    participants in the idle state leave the idle state as a function of the items of information determined during the at least three phases, and
    to determine the sequence of items of logical information to be determined in the third phase, for each item of logical information a plurality of bits of a message are evaluated, a further time interval between signal properties and/or edges and/or edge changes being determined, and subsequently the signal level of the bus being sampled at least once at a first sampling time and at a second sampling time, the temporal interval of the position of the first sampling time from the last signal property, and/or edge and/or edge change, used to determine the further time interval and/or the temporal interval between the first and the second sampling times being a function of the determined further time interval, and the item of logical information being derived as a function of the result of the at least two samplings.

9. The method of claim 8, wherein at at least one of the first sampling time and the second sampling time a multiple sampling is carried out, the time interval or intervals between the times of the multiple sampling being smaller than the time interval between the first sampling time and the second sampling time.

10. The method of claim 8, wherein for the determination of each individual item of logical information in the sequence of items of logical information, eight bits of the message are evaluated in each case.

11. The method of claim 8, wherein the time interval between the first sampling time and the second sampling time corresponds approximately to the determined further time interval.

12. The method of claim 8, wherein the time interval between the last signal property, and/or edge and/or edge change, used for the determination of the further time interval and the first sampling time corresponds approximately to the determined further time interval.

13. A bus connection unit for selectively waking participants of a bus system that are in the idle state, the participants not in the idle state exchanging messages via the bus using a serial communication protocol, the messages being characterized by a leading identifier, the participants not in the idle state deciding based on the identifier whether they receive the message, comprising:
  at least one evaluating arrangement to evaluate the messages by the participants in the idle state in at least three phases, by performing the following:
    determining in a first phase at least one of a number of signal properties, edges, and edge changes;
    determining in a second phase that a sequence of time intervals between at least one of signal properties, edges, and edge changes correspond to a synchronization pattern by which the message is identified as conforming to the communication protocol; and
    responsive to the indication, in the second phase and based on the sequence, that the message conforms to the communication protocol based on the time intervals determined in the second phase, determining in a third phase a sequence of items of logical information from the serial signal sequence of the message;
  wherein participants in the idle state leave the idle state as a function of the items of information determined during the at least three phases.

14. The bus connection unit of claim 13, wherein the individual arrangement can be supplied with an operating voltage separately via suitable voltage regulators.

15. The bus connection unit of claim 13, wherein at least one of the evaluating arrangements is suitable for selectively waking participants of a bus system that are in an idle state, the participants not in the idle state exchanging messages via the bus using a serial communication protocol, the messages being characterized by a leading identifier, the participants not in the idle state deciding based on the identifier whether they receive the message, and wherein the number of signal properties to be determined in the first phase is compared to a specified or specifiable number of signal properties, and the wake process is continued or not as a function of the result of the comparison.

* * * * *